United States Patent [19]
Woskow et al.

[11] 3,856,880

[45] *Dec. 24, 1974

[54] OXIDATIVE DEHYDROGENATION CATALYZED WITH PROMOTED ZINC FERRITE

[75] Inventors: Marvin Z. Woskow, Houston; Harold F. Christmann, Seabrook, both of Tex.

[73] Assignee: Petro-Tex Chemical Corporation, Houston, Tex.

[ * ] Notice: The portion of the term of this patent subsequent to Aug. 7, 1990, has been disclaimed.

[22] Filed: July 23, 1973

[21] Appl. No.: 381,813

Related U.S. Application Data
[63] Continuation-in-part of Ser. No. 15,904, March 2, 1970, Pat. No. 3,751,512.

[52] U.S. Cl. .......................... 260/680 E, 260/683.3
[51] Int. Cl. ............................................. C07c 5/18
[58] Field of Search ...................... 260/680 E, 683.3

[56] References Cited
UNITED STATES PATENTS

| | | | |
|---|---|---|---|
| 3,270,080 | 8/1966 | Christmann | 260/680 E |
| 3,303,235 | 2/1967 | Croce et al. | 260/680 E |
| 3,409,697 | 11/1968 | Callahan et al. | 260/680 E |
| 3,437,703 | 4/1969 | Reitmeier et al. | 260/669 |
| 3,751,512 | 8/1973 | Woskow et al. | 260/680 E |

*Primary Examiner*—Paul M. Coughlan, Jr.
*Attorney, Agent, or Firm*—N. Elton Dry

[57] ABSTRACT

Improved oxidative dehydrogenation catalysts are prepared by adding rhenium or a platinum group metal to a zinc ferrite oxidative dehydrogenation catalyst.

6 Claims, No Drawings

OXIDATIVE DEHYDROGENATION CATALYZED WITH PROMOTED ZINC FERRITE

This application is a continuation-in-part application of copending application Ser. No. 15,904, filed Mar. 2, 1970, now U.S. Pat. No. 3,751,512.

The present invention relates to the oxidative dehydrogenation of organic compounds over ferrite catalyst wherein the oxidative dehydrogenation system is modified by the presence of a promoting amount of rhenium or a platinum group metal.

Oxidative dehydrogenations employing ferrite catalysts are well known. U.S. Pat. Nos. 3,270,080; 3,284,536; 3,303,234; 3,303,235; 3,303,236; 3,303,238; 3,308,182; 3,324,195; 3,334,152; 3,342,890; 3,398,100; 3,450,787; 3,420,911; 3,420,912; 3,428,703 and 3,440,299 disclose such processes.

Briefly stated, the present invention is in a process for the oxidative dehydrogenation of organic compounds in the presence of oxygen and a metal ferrite catalyst wherein the improvement is a promoting amount of a metal selected from the group consisting of rhenium, platinum, palladium, rhodium, ruthenium, osmium and iridum. Although excellent results have been obtained with many of the catalysts described in the prior art, it is an object of this invention to provide further improved catalysts.

One of the primary objects in catalyst development is to produce more active catalysts which still have selectivity, generally higher yields per pass can be obtained by more active catalysts. However, even if the absolute yield is not increased, it is an important advantage of a more active catalyst that the process can be operated at a lower reaction temperature. It has been discovered that the process of this invention may be operated at lower dehydrogenation temperatures using the catalysts of this invention. There are distinct advantages in operating the dehydrogenation process at excessively high temperatures, and at certain temperatures the process becomes uneconomical. For one thing, the mechanical stresses in the reactors are more pronounced at higher temperatures and consequently it is necessary to compensate for these stresses in the construction of the reactor. At high temperatures there is a problem of embrittlement of the reactor materials. Another advantage resulting from operating at lower temperatures is that the problem of quenching of the reaction gases is alleviated when operating at these lower temperatures and quenching can either be reduced or in some instances entirely eliminated. By avoiding quenching or by reducing the amount of quench water, there is less steam generated due to quenching and correspondingly there is less steam to be condensed downstream. Still another advantage of operating at a lower temperature is that thermal cracking reactions are less pronounced. There is also the advantage that a shorter reactor bed can be utilized, particularly when a predominantely or essentially adiabatic reactor is employed.

Other advantages of this invention are possible, e.g., high selectivities and conversions are obtained. Also it is possible to obtain a higher percentage utilization of oxygen for the dehydrogenation reaction and to obtain high conversions and selectivities at relatively low ratios of oxygen to organic compound. Still another feature of this process is that it is not necessary to use excessive ratios of steam to organic compound to produce a given yield. These and other objects will become obvious from the following description of the invention.

The catalyst modifiers may be added to the metal ferrite by any suitable method. Generally the modifier will be added at such time that there will be intimate mixing with the other ingredients. If a catalyst carrier is employed one convenient method is to form a slurry of the modifier with the metal ferrite prior to coating on the carrier. The modifier may also be precipitated or dry mixed. Although aqueous mediums will generally be used it is contemplated that non-aqueous systems can be employed in the preparation of the modified catalysts such as $H_2SO_4$ $HNO_3$, ethyl alcohol, etc. It would generally appear to be preferable if the modifier is added to the preformed metal ferrite rather than incorporating the modifier with the ferrite precursor prior to forming the ferrites.

The rhenium or platinum metal modifier is added to the catalyst in a catalytic promoting amount. Generally a catalytic promoting amount for the defined modifiers will be not more than about two percent by weight based on the total weight of active catalysts components in no event would a catalyst carrier, if any, be considered in determining the amount of modifier. It must be appreciated that the listed modifiers can be effective catalysts poisons if used in excessive quantities. It has been found that ruthenium and rhodium must be used in quantities of less than 0.1% preferably less than about 0.09% for this reason. The modifier will generally be added to the catalysts in at least 0.005% up to an amount where said modifier is a substantial poison rather than a promoter for said catalysts, i.e., a promoting quantity.

The modifiers described can be employed in the form of the elemental metal or a metal compound. Often a soluble form of metal compound will be employed. Both organic and inorganic compounds can be used. The elemental metals and organic compounds are usually changed to inorganic compounds thereof, at least on the surface, under the reaction conditions set forth herein. Particularly effective are inorganic compounds such as the oxides and salts including the phosphate, sulfates, phosphites, sulfites, molybdates, tungstates, vanadates, silicates, thiocyanates, thiosulfates and the like, for example, palladium chloride, palladium nitrate, palladium sulfate, platinum chloride, platinum tetrafluoride, platinum oxide, ruthenium tetrachloride, rhodium hexa-amminechloride, rhodium nitrate, osmium trichloride, iridium dioxide, rhenium oxide, palladium acetate, platinum acetyl acetonate and the like.

The catalysts to be modified contain iron, oxygen and at least one other metallic element Me. The catalysts comprise crystalline compositions or iron oxygen, and at least one other metallic element Me. The catalysts comprise ferrites. Ordinarily, the ionic radius of the second metallic ingredient(s) Me is small enough that the oxygen anions are not spread too far apart. That is, the elements must be able to form a crystalline structure with the iron and oxygen.

A preferred type of catalyst of this type is that having a face-centered cubic form of crystalline structure. Examples of this type of catalyst are ferrite of the general formula $MeO.Fe_2O_3$ where Me is a divalent metal cation such as zinc.

Suitable catalysts may also be ferrites wherein other metals are partially substituted for the iron. For example, atoms having a valence of +3 may be partially substituted for some of the $Fe^{+++}$ atoms. Also, metal atoms having a valence of +4 may replace some of the $Fe^{+++}$ ions. However, the catalysts will still suitably have iron present in an amount described above in relation to the total atoms of the second metallic ingredient(s).

The catalyst may have the iron combined in crystalline structure with oxygen and more than one other metallic element, as mentioned above. For example, a preferred type of ferrite is that essentially or approximately of the formula, $MeFe_2O_4$, where Me represents a zinc ion. However, Me can be a combination of zinc ion and one or more ions selected from the transition elements Mg, Ca, Sr, Ba, Cr, Mn, Ni or Cd.

Examples of catalysts according to this application and copending application Ser. No. 15,904 are such as ferrites containing iron combined with at least one element selected from the group consisting of Mg, Zn, Ni, Mn, Cu, Cd, Ca, Ba, Sr, Al, Cr, Ti, V, Mo, W, Na, Li, K, Sn, Pb, Sb, Bi, Ga, Ce, La, Th, other rare earth elements and mixtures thereof, with a preferred group being Mg, Ca, Sr, Ba, Mn, Cr, Ni, Zn, Cd, and mixtures thereof, and a particularly preferred metal being zinc. Examples of such ferrites are magnesium ferrite, nickel ferrite, zinc ferrite, barium ferrite, strontium ferrite, manganese ferrite, calcium ferrite, cadmium ferrite, silver ferrite, zirconium ferrite, and rare earth ferrites such as cerium ferrite or mixtures of ferrites. Examples of mixed ferrites are magnesium ferrite plus zinc ferrite, magnesium ferrite plus nickel ferrite plus zinc ferrite, magnesium ferrite plus manganese ferrite. As explained above, these ferrites may be physical mixtures of the ferrites or may contain crystals wherein the different metallic atoms are contained in the same crystal, or a combination of physical mixtures and chemical combinations. Some examples of a chemical combination would be magnesium zinc ferrite, zinc chromium ferrite and lanthanum chromium ferrite.

The valency of the metals in the catalysts do not have to be any particular values, although certain combinations are preferred or disclosed elsewhere. The determination of the valency of the ions is sometimes difficult and the results are uncertain. The different ions may exist in more than one valency state. However, a preferred catalyst is one which has the iron predominately in the $Fe^{+++}$ state. Some ferrites are described in Ferromagnetism, By Richard M. Bozorth (D. Van Nostrand Co., Inc., 1951), which disclosure is hereby incorporated by reference.

A preferred class of catalysts containing two second metallic ingredients are those of the basic formula $Me_bZn_aFe_cO_4$ where $a$ can vary within the range of about 0.1 to about 3, $b$ can vary from greater than 0 to less than 2 and $c$ can vary from greater than 0 to less than 3. Me can be any of the metallic ingredients Mg, Ba, La, Ni, Cr and Cd.

The preferred compositions exhibit a certain type of X-ray diffraction pattern. The preferred compositions do not have any sharp X-ray diffraction reflection peaks as would be found, e.g., in a highly crystalline material having the same chemical composition. Instead, the preferred compositions of this invention exhibit reflection peaks which are relatively broad. The degree of sharpness of the reflection peak may be measured by the reflection peak bank width at half height (W h 2). In other words, the width of the reflection peak as measured at one-half of the distance to the top of the peak is the "band width at half height." The band width at half height is measured in units of °2 theta. Techniques for measuring the band widths are discussed, e.g., in Chapter 9 of Klug and Alexander, X-ray Diffraction Procedures, John Wiley and Son, N.Y., 1954. The observed band widths at half height of the preferred compositions of this invention are at least 0.16°2 theta and normally will be at least 0.20° theta.*
For instance, excellent compositions have been made with band widths at half height of at least 0.22 or 0.23°2 theta. The particular reflection peak used to measure the band width at one-half height is the reflection peak having Miller (hkl) indices of 220. (See, e.g., Chapter of Klug and Alexander, ibid.) Applicants do not wish to be limited to any theory of the invention in regard to the relationship between composition activity and band width.

*The powder diffraction patterns may be made, e.g., with a Norelco constant potential diffraction unit type No. 12215/0 equipped with a wide range goniometer type No. 42273/0 cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1,160 volts and the pulse height analyzer is set to accept pulses with amplitudes between 10 and 30 volts only. Slits used are divergence 1°, receiving 0.006 inches and scatter 1°. Strip chart recordings for identification are made with a scanning speed of ¼° per minute, time constant of 4 seconds and a full scale of $10^4$ counts per second. No correction is made for Kα doublet or instrumental broadening of the band widths.

Suitable preferred ferrites according to this invention are zinc ferrites having X-ray diffraction peaks within the d-spacings 4.83 to 4.89, 2.95 to 3.01, 2.51 to 2.57, 2.40 to 2.46, 2.08 to 2.14, 1.69 to 1.75, 1.59 to 1.65 and 1.46 to 1.52 with the most intensive peak being between 2.95 to 3.01.

Ferrite formation may be accomplished by reacting an active compound of iron with an active compound of the designated metals. By active compound is meant a compound which is reactive under the conditions to form the ferrite. Starting compounds of iron or the other metal may be such as the nitrates, hydroxides, hydrates, oxalates, carbonates, acetates, formates, halides, oxides, etc. The starting compounds are suitably oxides or compounds which will decompose to oxides during the formation of the ferrite such as organic and inorganic salts or hydroxides. For example, zinc carbonate may be reacted with iron oxide hydrates to form zinc ferrite. Salts of the desired metals may be co-precipaitated and the precipitate heated to form the ferrite. Desired ferrites may be obtained by conducting the reaction to form the ferrite at relatively low temperatures, that is, at temperatures lower than some of the very high temperatures used for the formation of some of the semi-conductor applications. Good results, e.g., have been obtained by heating the ingredients to a temperature high enough to produce the required ferrite but at conditions no more severe than equivalent to heating at 950° C or 1,000° C for 90 minutes in air and generally the maximum temperature will be less than 1,300°C and preferably less than 1,150°C. Methods for preparing catalysts suitable for this invention are disclosed in U.S. Pat. Nos. 3,270,080; 3,284,536; 3,303,234-6; 3,303,238, 3,308,182; 3,334,152; 3,342,890 and 3,450,787 and these disclosures are hereby incorporated by reference.

The catalysts may contain an excess of iron over the stoichiometric amount to form the ferrite. For example in a ferrite of the type $MeFe_2O_4$ the stoichiometric amount of iron would be 2 atoms per atom of Me. The iron (calculated as $Fe_2O_3$) may be present in an amount of at least about 10 percent in excess of the stoichiometric amount and preferably may be present in an amount of at least 14 percent in excess. Suitable ranges of iron are from about 10 to 200 percent excess. Similarly the catalysts may contain an excess of Me over the stoichiometric amount. A suitable range of Me content would be from about 0.05 to 2 atoms of Me per atom of iron.

The compositions of this invention may also comprise additives, such as disclosed in U.S. Pat. No. 3,270,080 and U.S. Pat. No. 3,303,238. Phosphorus, silicon, boron sulfur or mixtures thereof are examples of additives. Excellent catalysts may contain less than 5 weight percent, and preferably less than 2 weight percent, of sodium or potassium in the surface of the catalyst. Solid sulfur containing compounds such as manganese sulfate can be incorporated along with zinc carbonate to form a sulfur containing manganese ferrite. Another method is to mix a ferrite, e.g., zinc ferrite with a solution of sulfuric acid. The resulting slurry can then be dried and pelleted or coated on a carrier and then dried.

Carriers or supports for the catalyst may be employed such as alumina pumice, silica and so forth. Diluents and binders may also be used. Unless stated otherwise, the compositions referred to in this application are the main active constituents of the dehydrogenation process during dehydrogenation and any ratios and percentages refer to the surface of the catalyst in contact with the gaseous phase during dehydrogenation.

The catalysts may be activated or regenerated by reducing with a reducing gas, e.g., such as hydrogen or hydrocarbons. For example, the preformed compositions may be reduced with, e.g., hydrogen at a temperature of at least 250° C. with the temperature of reduction generally being no greater than 850°C. The period of time for reduction will be dependent somewhat on the temperature of reduction.

The process of this invention may be applied to the dehydrogenation of a wide variety of organic compounds. Such compounds normally will contain from 2 to 20 carbon atoms, at least one

grouping, a boiling point below about 350°C, and such compounds may contain other elements, in addition to carbon and hydrogen such as oxygen, halogens, nitrogen and sulfur. Preferred are compounds having 2 to 12 carbon atoms, and especially preferred are compounds of 3 to 6 or 8 carbon atoms.

Particularly preferred are hydrocarbons having 4 to 12 carbon atoms and more preferably, 4 to 8 carbon atoms.

Among the types of organic compounds which may be dehydrogenated by means of the process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile; propionaldehyde to acrolein; ethyl chloride to vinyl chloride; methyl isobutyrate to methyl methacrylate; 2 or 3 chlorobutene 1 or 2, 3 dichlorobutane to chloroprene; ethyl pyridine to vinyl pyridine; ethylbenzene to styrene; isopropylbenzene to α-methyl styrene; ethylcyclohexane to styrene; cyclohexane to benzene; ethane to ethylene or acetylene; propane to propylene, methyl acetylene, allene, or benzene; isobutane to isobutylene; n-butane to butene and butadiene-1,3; n-butene to butadiene-1,3, and vinyl acetylene; methyl butene to isoprene; cyclopentane to cyclopentene and cyclopentadiene-1,3; n-octane to ethyl benzene and ortho-xylene; monomethylheptanes to xylenes; ethyl acetate to vinyl acetate; 2,4,4-trimethylpentane to xylenes; and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group such as the conversion of propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 1,3 dichlorobutane, 1,4 dichlorobutane, the chlorofluoroethanes, methyl pentane, methylethyl ketone, diethyl ketone, n-butyl alcohol, methyl propionate and the like.

Suitable dehydrogenation reactions are the following: Acyclic compounds having 4 to 5 non-quarternary contiguous carbon atoms to the corresponding olefins, diolefins or acetylenes having the same number of carbon atoms; aliphatic hydrocarbons having 6 to 16 carbon atoms and at least one quarternary carbon atom to aromatic compounds, such as 2,4,4-trimethylpentene-1 to a mixture of xylenes; acyclic compounds having 6 to 16 carbon atoms and no quarternary carbon atoms to aromatic compounds such as n-hexenes to benzene; cycloparaffins and cycloolefins having 5 to 8 carbon atoms to the corresponding olefin, diolefin or aromatic compound, e.g., cyclohexane to cyclohexene or cyclohexadiene or benzene; aromatic compounds having 8 to 12 carbon atoms including one or two alkyl side chains of 2 to 3 carbon atoms to the corresponding aromatic with unsaturated side chain such as ethyl benzene to styrene.

The preferred compounds to be dehydrogenated are hydrocarbons with particularly preferred class being acyclic non-quarternary hydrocarbons having 4 to 5 contiguous carbon atoms or ethyl benzene and the preferred products are n-butene-1 or 2, butadiene-1,3, vinyl acetylene, 2-methyl-1-butene, 3-methyl-1-butene, 2-methyl-2 butene, isoprene, styrene or mixtures thereof. Especially preferred as feed are n-butene-1 or 2 and the methyl butenes and mixtures thereof such as hydrocarbon mixtures containing these compounds in at least 50 mol percent.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The organic compound to be dehydrogenated is contacted with oxygen in order for the oxygen to oxidatively dehydrogenate the compound. Oxygen may be fed to the reactor as pure oxygen, as air, as oxygen-enriched air, oxygen mixed with diluents, solid oxidants, and so forth. Oxygen may also be added in increments to the dehydrogenation zone. Although determinations regarding the mechanism of reaction are difficult, the process of this invention is an oxidative dehydrogenation process wherein the predominant mechanism of this invention is by the reaction of oxygen with the hydrogen released from the hydrocarbon.

The amount of oxygen employed may vary depending upon the desired result such as conversion, selectivity and the number of hydrogen atoms being removed. Thus, to dehydrogenate butane to butene requires less oxygen than if the reaction proceeds to product butadiene. Normally oxygen will be supplied (including all sources, e.g. air to the reactor) in the dehydrogenation zone in an amount from about 0.2 to 1.5, preferably 0.3 to 1.2, moles per mol of $H_2$ being liberated from the organic compound. Ordinarily the mols of oxygen supplied will be in the range of from 0.2 to 2.0 mols per mol of organic compound to be dehydrogenated and for most dehydrogenations this will be within the range of 0.25 to 1.5 mols of oxygen per mol of organic compound.

Preferably, the reaction mixture contains a quantity of steam or diluent such as nitrogen with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam. These gases serve also to reduce the partial pressure of the organic compound.

It is one of the advantages of this invention that halogen may also be present in the reaction gases to give excellent results. The presence of halogen in the dehydrogenation zone is particularly effective when the compound to be dehydrogenated is saturated, such as a saturaged hydrocarbon. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, methyl chloride, 1,2-dibromo ethane, cycloaliphatic halides, ammonium iodide, ammonium bromide; ammonium chloride; sulfuryl chloride; metal halides including molten halides; and the like. The halogen may be liberated partially or entirely by a solid source as disclosed in the process of U.S. Pat. No. 3,130,241 issued Apr. 21, 1964. Mixtures of various sources of halogen may be used. The amount of halogen, calculated as elemental halogen, may be as little as about 0.0001 or less mol of halogen per mol of the organic compound to be dehydrogenated to as high as 0.2 to 0.5.

The temperature for the dehydrogenation reaction generally will be at least about 250°C, such as greater than about 300°C, or 375°C., and the maximum temperature in the reactor may be about 700°C or 800°C. or perhaps higher such as 900°C. under certain circumstances. However, excellent results are obtained within the range of or about 350°C. to 700°C., such as from or about 400°C. to or about 675°C. The temperatures are measured at the maximum temperature in the dehydrogenation zone.

The gaseous reactants may be conducted through the reaction chamber at a fairly wide range of flow rates. The optimum flow rate will be dependent upon such variables as the temperature of reaction, pressure, particle size, and so forth. Desirable flow rates may be established by one skilled in the art. Generally the flow rates will be within the range of about 0.10 to 10 liquid volumes of the organic compound to be dehydrogenated per volume of dehydrogenation zone containing catalyst per hour (referred to as LHSV). Usually, the LHSV will be between 0.15 and about 5. For calculation, the volume of a fixed bed dehydrogenation zone containing catalyst is that original void volume of reactor space containing catalyst.

The process of this invention utilizes either a fixed bed or moving bed, such as fluidized catalyst, reactor. Reactors which have been used for the dehydrogenation of hydrocarbons by non-oxidative dehydrogenation are satisfactory such as the reactors for the dehydrogenation of n-butene to butadiene-1,3. Although means to remove heat from the reactor may be employed, such as coils, the invention is particularly useful with essentially adiabatic reactors where heat removal is a problem.

The following examples are only illustrative of the invention and are not intended to limit the invention. All percentages are weight percent unless specified otherwise. All conversions, selectivities and yields are expressed in mol percent of the designated feed.

EXAMPLE 1

A zinc ferrite catalyst was prepared by coating zinc ferrite on an alumina support by adding 87.5 parts by weight zinc ferrite particles to 200 parts by weight. To this mixture was added 3.12 parts by weight phosphoric acid and approximately 100 parts by weight water. The mixture was then tumbled dry. A portion of the dried catalyst material was placed in a fixed bed reactor.

The feed was butene-2 at LHSV of 1.5 with the mole ratio of steam to oxygen (fed as air) to hydrocarbon of 20/0.50/1. The inlet temperature was approximately 720° F and the maximum temperature in the bed was approximately 1,000° F. The butadiene conversion/selectivity/yield (mole %) was 31/94.8/29.3.

EXAMPLE 2

This example demonstrates a palladium modified zinc ferrite catalyst prepared substantially as in Example 1 with the single exception that 0.02% palladium (II) chloride was added to the slurry just prior to tumble drying. The palladium containing catalyst was used to dehydrogenate butene-2 using the same conditions as in Example 1 with the exception that the maximum temperature in the bed was approximately 920° F. The butadiene conversion/selectivity/yield (mole %) was 49.2/92.4/45.5.

The invention claimed is:

1. In a process for the oxidative dehydrogenation of hydrocarbon compounds having 4 to 12 carbon atoms, at least one

grouping and having a boiling point below about 350°C, in the presence of oxygen and a metal ferrite catalyst consisting essentially of zinc ferrite the improvement consisting essentially of conducting said oxidative dehydrogenation process in the presence of said catalyst which contains a promoting amount in the range of 0.005 to 2 weight percent of a metal selected from the group consisting of rhenium, platinum, palladium, rhodium, ruthenium, osmium, and iridium, provided that ruthenium and rhodium are present in an amount of less than 0.1 percent.

2. The process according to claim 1 wherein the hydrocarbon contains 4 to 8 carbon atoms.

3. The process according to claim 2 wherein the hydrocarbon is n-butene.

4. The process according to claim 1 wherein the promoting metal is palladium.

5. The process according to claim 1 wherein the promoting metal is rhenium.

6. The process according to claim 3 wherein the promoting metal is palladium.

* * * * *